United States Patent [19]

May

[11] Patent Number: 5,235,355

[45] Date of Patent: Aug. 10, 1993

[54] BUOYANT EYEGLASS RETAINERS

[76] Inventor: David G. May, 28 Windsor Dr., Little Rock, Ark. 72209

[21] Appl. No.: 694,888

[22] Filed: May 2, 1991

Related U.S. Application Data

[63] Continuation-in-part of Ser. No. 432,619, Nov. 6, 1989, Pat. No. 5,015,085.

[51] Int. Cl.⁵ .............................................. G02C 5/14
[52] U.S. Cl. .................................... 351/123; 351/156; 351/157
[58] Field of Search ................. 351/156, 157, 123, 43; 24/3 C; 2/452

[56] References Cited

U.S. PATENT DOCUMENTS

| | | | |
|---|---|---|---|
| 1,819,738 | 8/1931 | Daniels | 351/157 |
| 2,481,946 | 9/1949 | Pendleton | 351/157 |
| 4,820,036 | 4/1989 | Seet | 351/156 |

Primary Examiner—Bruce Y. Arnold
Assistant Examiner—Hung Xuan Dang
Attorney, Agent, or Firm—Stephen D. Carver

[57] ABSTRACT

Buoyant jewelry for retaining and protectinq personal articles. Each jewelry/retainer comprises a brightly colored, buoyant body coupled to one or more fasteners for securing various articles such as sunglasses, keys, or personal care products which the swimmer or water sportsman desires to conveniently retain. The jewelry items comprise eyeglass retainers, bracelets, anklets, name badges, and necklaces. The body comprises a resilient core of low-density foam covered by a flexible, tubular sheath. The sheath brightly colors and reinforces the body. In one mode the fasteners comprise resilient tubes for axially gripping the ear pieces of conventional glasses. An alternative fastener comprises a flexible fabric channel for receiving fine wire or wraparound ear pieces. Another embodiment comprises a cord looped through an item to be floated, and an optional cap is provided for slip-fitting over existing containers of personal care products. An alternative jewelry item configuration comprises a buoyant loop formed by clamping the ends in generally parallel relationship, so that the fastener projects angularly away from the loop.

9 Claims, 4 Drawing Sheets

BUOYANT EYEGLASS RETAINERS

CROSS-REFERENCE TO RELATED APPLICATION

This Application is a Continuation-in-Part of my co-pending application, Ser. No. 07/432,619; Filing Date: Nov. 6, 1989; Entitled: Floatable Retainer for Eyeglasses; Examiner: R. Bovernick; Group Art Unit: 257, now U.S. Pat. No. 5,015,085.

BACKGROUND OF THE INVENTION

This invention relates broadly to decorative jewelry articles for water related activities. More particularly, my invention relates to buoyant eyeglass retainers, especially adapted for beach use, for holding personal articles such as eye glasses.

As will be appreciated, personal items such as sunglasses, keys, and other beach accessories are easily misplaced, and may be quickly lost if dropped into the water. Unfortunately, conventional beachwear items seldom provide adequate pockets or pouches for conveniently storing such articles. Hence, it is desired to provide comfortable and attractive means for retaining such articles on the wearer's body, and for protecting them from loss in the water.

In the prior art known to me, various eyeglass retainers have been proposed for sportsmen. For example, the headband proposed by Fuller U.S. Pat. No. 4,133,604 issued Jan. 9, 1979, comprises a flexible band which terminates in a pair of tubular ends. The ends slidably engage the temple pieces, so that the eyeglasses are securely retained in position during sports activities and the like. U.S. Pat. No. 4,541,696 issued to Winger/Friedopher on Sep. 17, 1985 teaches a tubular, knit cord for retaining eyeglasses about the neck.

A similar device is illustrated in U.S. Pat. No. 2,481,946 issued to Pendleton on Sep. 13, 1949. U.S. Pat. No. 3,874,776 issued to Seron on Apr. 1, 1975 teaches a flexible eyeglass retainer which is adjustably coupled to the eyeglass templates by a flexible loop. Bloom, U.S. Pat. No. 2,660,092 issued Nov. 24, 1953 suggests the desirability of providing a flexible, adjustable-width, cushioned headstrap for retaining eyeglasses in position. The strap terminates at both ends in a flexible loop, which is captured by a slidable pin or hook associated with the glasses frame. McCulley U.S. Pat. No. 4,848,861 teaches an earpiece cushion for eyeglasses.

Various structures for floating a pair of glasses are also known in the prior art. For example, U.S. Pat. No. 3,711,190 issued to Blair on Jan. 16, 1973 comprises a blow-molded air cell which is threaded by resilient loops to the temples of the eyeglasses. Related devices are illustrated in U.S. Pat. No. 3,038,375 issued to Gansz on Jun. 12, 1962 and U.S. Pat. No. 3,390,938 issued to Gansz on Jul. 2, 1968. Floatable spectacles are taught by Goodman in U.S. Pat. No. 3,740,124 issued Jun. 19, 1973 and by Wilson in U.S. Pat. No. 3,517,989 issued Jun. 30, 1970.

However, none of the known prior art provides a comfortable, floatable. The prior art known to me fails to adequately provide floatable means for attachment to various common beach items, especially those which are not already provided with a fastening pin, loop, or chain. The floatable retainer disclosed in my previous patent application is particularly well-suited for eyeglasses of ordinary configuration, having a generally straight ear piece. However, it does not contemplate securing very fine wire or wrap-around ear pieces, or retaining other swimmer's articles.

Most importantly, none of the prior art known to me satisfactorily addresses the need for providing a comfortable, attractive device for floatably retaining and thereby preventing the loss of a variety of different beach oriented accessories.

SUMMARY OF THE INVENTION

The buoyant jewelry of the present invention safely and comfortably suspends articles such as sunglasses and the like on the wearer's body. My retainers are ideal for use by swimmers or other water sportsmen. Each retainer comprises a brightly colored, buoyant body which may be comfortably looped about the neck or limbs of the wearer. Eyeglasses equipped with any version of my retainer will be kept afloat for long periods of time if inadvertently dropped into the water. If the eyeglasses are dropped or inadvertently fall off, they can be easily spotted and retrieved.

Preferably the body comprises an elongated core of resilient, low-density closed cell foam, such as polyethylene or neoprene foam. Importantly, in some configuration coloration and structural strength are achieved by a flexible, tubular sheath which covers the core, but does not necessarily have to be used. The sheath is preferably a unitary, knitted tube of fabric which resiliently grips the foam core. In the best mode it is seamless. Alternatively the sheath can be made of other materials, so it is not limited to knitted tubular cloth. For example, the sheath can be made of a vinyl coating which is usually dip dried on.

The ends of the sheath project to the ends of the core and are preferably sealed by a clamp or clamps. The clamps couple a fastener for attaching the desired article to the elongated body. The clamps are preferably obscured from view and undesired contact by a resilient, tubular cover which axially slip-fits over the clamp.

In the best mode, the fasteners comprise resilient, ovals which are constrained by compressed clamps. The ovals and clamps are substantially covered by small plastic tubes. A portion of the ovals emerging from the tubes may be penetrated by a portion of the item being held. For example, they may receive a portion of the ear pieces of conventional glasses to resiliently retain, suspend and/or float them. Alternatively the end fasteners may comprise flexible extruded latex rubber tubes attached to each end of the floatable body. The tubes may axially receive the ear pieces of conventional glasses and resiliently conform to firmly retain the ear pieces against slipping.

Alternative fasteners comprise flexible fabric grips stitched together to form a channel for receiving ear pieces. The fabric grips may be attached to opposing ends of the floatable eyeglass retainer. When eyeglasses are installed upon the fasteners, the tubular cover abuts the ear piece, frictionally engaging it to prevent it from slipping out of the fastener. Several different modes of attachment and fastening to eyeglasses can be employed, and are not limited to these before mentioned modes of attachment.

A third alternative configuration provides a small buoyant loop adapted to be worn about the wrist or ankle. The ends of the buoyant body are axially aligned end-to-end within the clamp, so that a smooth, unitary, circular configuration is achieved. The fastener comprises a resilient oval or loop which projects outwardly from the clamp alongside the buoyant loop. The loop is capable of receiving a chain or key ring.

Thus it is a fundamental object of the present invention to provide buoyant jewelry.

Another object is to provide brightly colored beach eyeglass retainer that assume a variety of configurations.

A similar object is to provide a retainer for securing personal items.

A still further object is to provide retainers capable of supporting various articles comfortably on the body of the wearer.

Another broad object of the present invention is to provide a decorative jewelry item which retains personal items such as eyeglasses against loss and damage.

A further broad object is to provide an eyeglass retainer that keeps personal articles afloat in the event they are dropped in the water.

Yet another object of the present invention is to provide a lightweight, comfortable retainer for eyeglasses.

An additional object of the present invention is to provide a buoyant retainer capable of floating personal articles such as eyeglasses, and keys until they can be retrieved from the water.

Still another object of the present invention is to provide a floatable article retainer for water sportsmen which may be comfortably worn about the neck, shoulder, or limbs.

Another object of the present invention is to provide a buoyant article retainer which facilitates detection and retrieval of an article lost or dropped in the water.

Yet another object of the present invention is to provide a buoyant retainer suitable for attaching tubes or bottles of personal care products.

An additional object of the present invention is to provide a buoyant retainer of the nature described which is suitable for attachment to a key chain or key ring.

A further specific object of the present object is to provide a body-worn, resilient, floatable retainer which can be used to retain eyeglasses having fine wire or wrap-around ear pieces.

An additional object of the present invention is to provide a high-visibility, buoyant retainer suitable for use by water sportsmen for retaining personal care products about the neck.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE DRAWINGS

Figure 1:
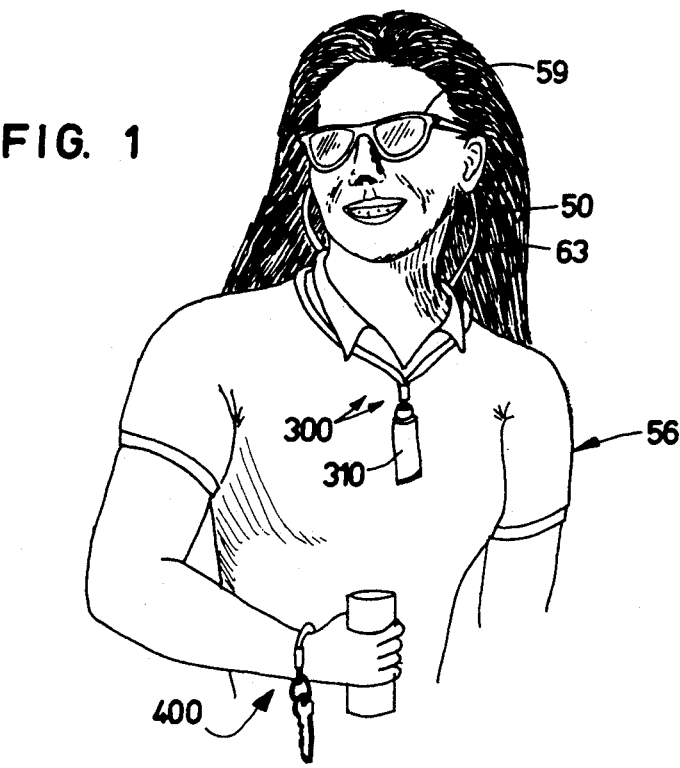
FIG. 1 is a pictorial view illustrating several modes of my Buoyant Jewelry worn by a typical user.

With reference to the accompanying drawings, various embodiments of my new buoyant jewelry/retainer invention are illustrated in use by a typical user. Hereinafter the nouns "jewelry" and "retainer" are used interchangeably. With initial reference to FIGS. 1-5, the best mode is broadly designated by the reference numeral 50. Retainer 50 is worn comfortably about the neck of a wearer 56 to secure a pair of sunglasses or eyeglasses 59.

Figure 2:
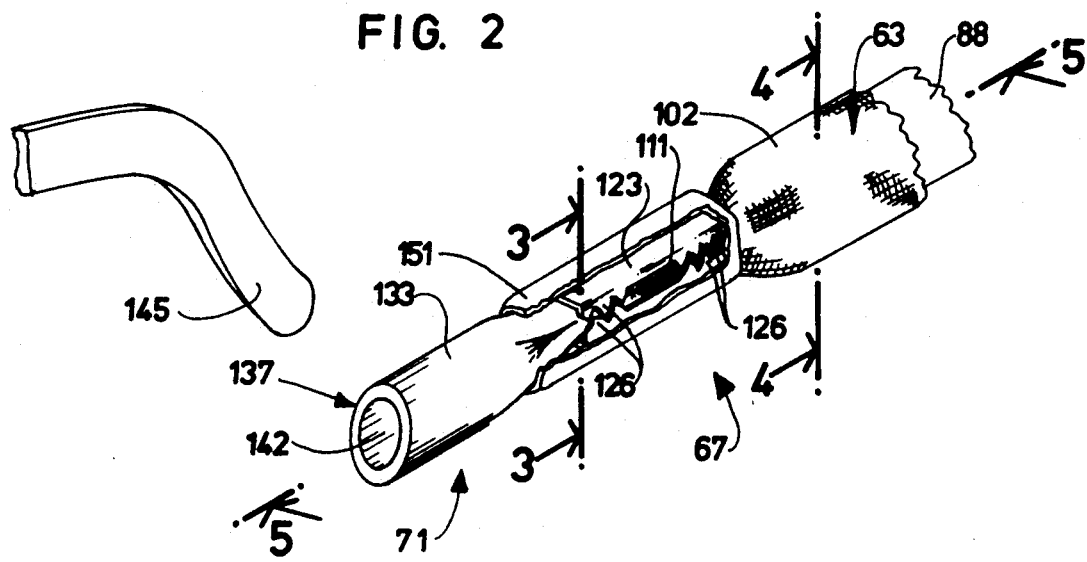
FIG. 2 is an enlarged, fragmentary, perspective view of one end fastener, in which portions are broken away for clarity.
Figure 3:
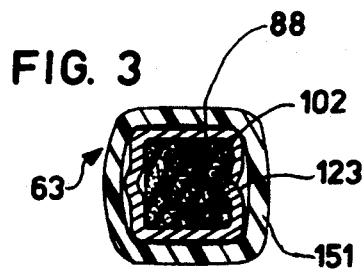
FIG. 3 is an enlarged cross-sectional view taken generally along line 3—3 of FIG. 2.
Figure 4:
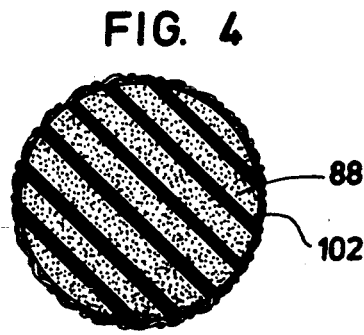
FIG. 4 is an enlarged cross-sectional view taken generally along line 4—4 of FIG. 2.

Jewelry item 50 (FIG. 1) comprises an elongated body broadly designated by the reference numeral 63 (FIG. 2). Body 63 comprises a pair of ends 67. Resilient, tubular fasteners broadly designated by the reference numeral 71 are permanently coupled to each of the ends 67 and are slidably mounted upon the temple pieces of the wearer's glasses 59. With specific reference to FIG. 3, body 63 comprises a unitary, elongated, buoyant rod or core 88. (The nouns "core" and "rod" are used interchangeably).

Core 88 preferably comprises a lightweight, flexible low-density foam, such as neoprene or polyethylene foam. However, it will be appreciated that body 63 may also be constructed of other lightweight, buoyant material which can be molded into unitary, elongated body 63.

Core 88 is coaxially ensconced within a resilient, tubular sheath or covering 102. Sheath 102 preferably comprises a unitary, seamless tube of knitted fabric, such as polyester. Sheath 102 slip-fits over core 88, and it resiliently conforms to core 88 to provide a gripping surface. Preferably sheath 102 is comprised of a highly visible, brightly colored fabric which may be easily spotted against any natural background, such as water, sand, or furniture. Thus, retainer 50 immediately attracts attention to the glasses 59 so that they are not easily misplaced or inadvertently trampled. Moreover, if the glasses are dropped into the water, the brightly colored retainer 50 can be easily spotted on the water's surface, readily enabling retrieval.

Figure 5:
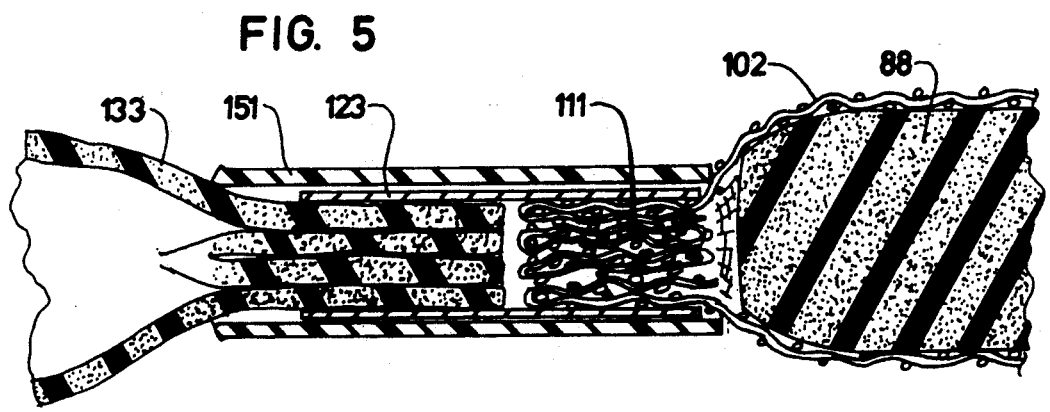
FIG. 5 is an enlarged longitudinal cross-sectional view taken generally along line 5—5 of FIG. 2.

As best viewed in FIGS. 2 and 5, the end 111 of sheath 102 and the end of the core 88 are crimped together. Thus, core 88 is completely enclosed when ends 111 are compressed by a rigid clamp 123 which permanently couples the fasteners to the body. As seen for example in FIGS. 2, 6 and 9, the tubular, preferably metallic clamp 123 comprises a plurality of spaced apart teeth 126. Teeth 126 capture the ends 111 (FIG. 2) of sheath 102 to firmly attach the fastener to the body 63. Members 126 at least partially capture fasteners 71 which couple the glasses 59 to the retainer.

In the best mode, fasteners 71 comprise a hollow tube 133 of smooth, resilient material such as neoprene or rubber. Its outer end 137 defines a hollow interior 142, into which the ear piece 145 of glasses 59 is coaxially fitted (FIG. 2). In use, tube 133 is slipped over ear piece 145, and resiliently conforms to the contour of the ear piece. Thus, glasses 59 are snugly, safely, and nondestructibly engaged and protected against slipping. Based on my experimentation, substantial force is required to extricate the ear piece from the tube 133 once properly mounted. Moreover, the soft resilient material rests very comfortably against the wearer's skin and does not irritate.

A tubular cover 151 preferably comprised of resilient, synthetic material slip-fits over the outer periphery of clamps 123. Cover 151 serves the dual purpose of shielding the wearer 56 from contact with the clamp 123 and of aesthetically obscuring the ends 111 of the sheath and tube 133 from view.

Even if the retainer 50 is removed or falls from the wearer's neck, glasses 59 remain firmly attached to the retainer. In the event the retainer 50 inadvertently falls into the water, the buoyant core 88 will keep the glasses afloat for an indefinite period. The floating glasses 59 may thus be readily detected and conveniently retrieved.

Figure 6:
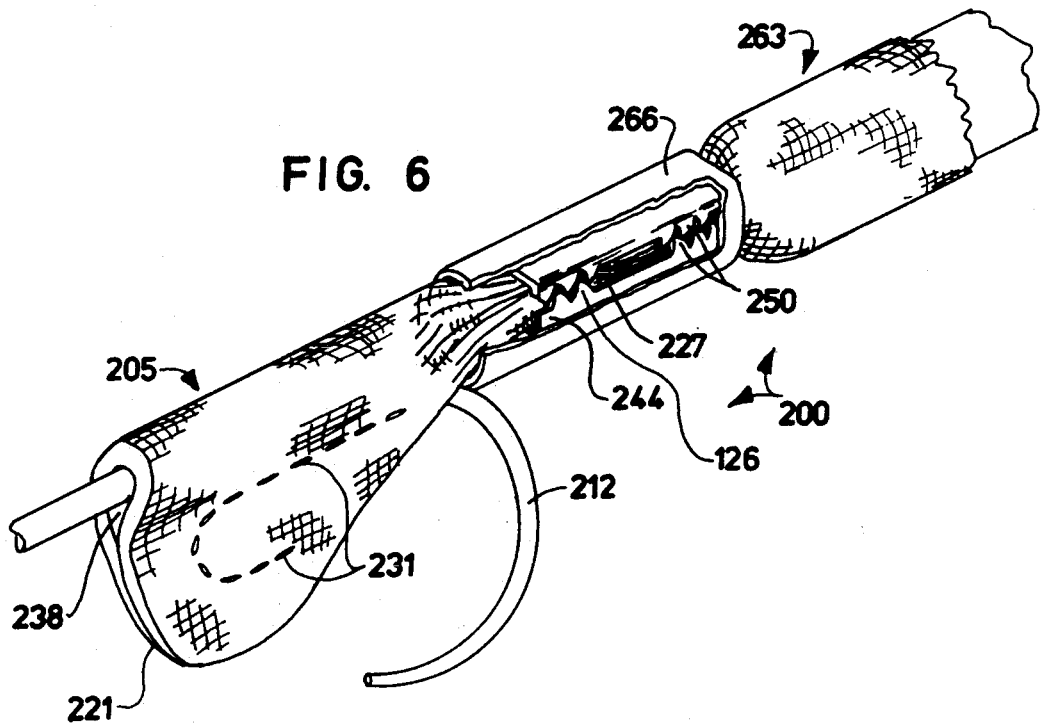
FIG. 6 is a fragmentary, perspective view of a first alternative fastener configuration.
Figure 7:
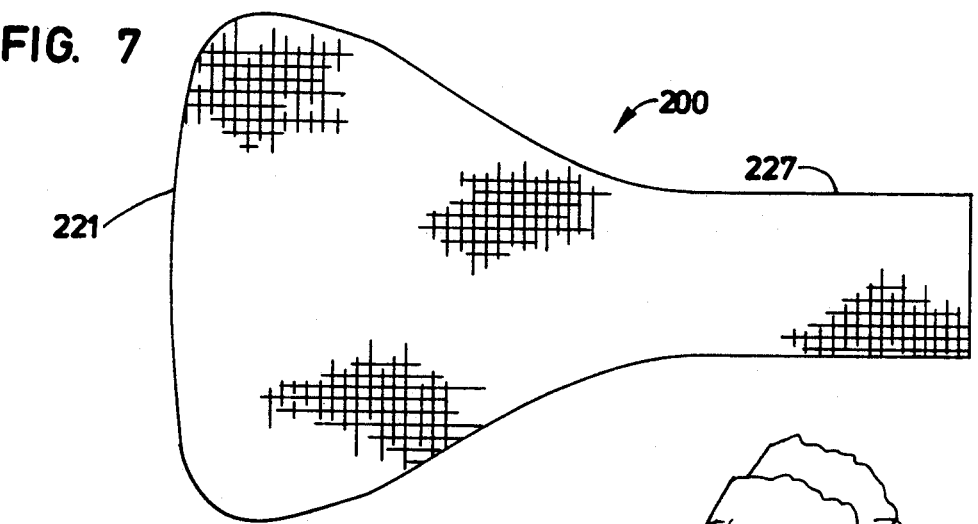
FIG. 7 is a plan view of the fastener of FIG. 5 prior to installation.

Reference is now directed to FIGS. 6–7, wherein a first alternative fastener configuration 200 is shown. This alternative configuration, is particularly well adapted for use on eyeglasses which have extremely fine, metallic, or wrap-around ear pieces 212 (FIG. 6). Fastener 205 is preferably formed of stitched fabric. It comprises a generally circular head 221 which terminates in an integral, elongated tail 227. In assembly, the circular head 221 is preferably folded in half and secured by stitches 231 or the like to form an interior channel 238. The ear piece 212 is installed axially through channel 238 and protrudes through the innards of the fastener, as best viewed in FIG. 6.

Tail 227 is axially secured within clamp 244 by gripping members 250. Clamp 244 which also engages the end of the buoyant retainer body 263. A tubular cover 266 similar to cover 151 of the best mode obscures the clamp 244 and fastener tail 227. Cover 266 also contacts the ear piece 212 and deflects it downwardly, which facilitates installation and prevents the ear piece from subsequently slipping out of fastener 200.

Figure 8A:
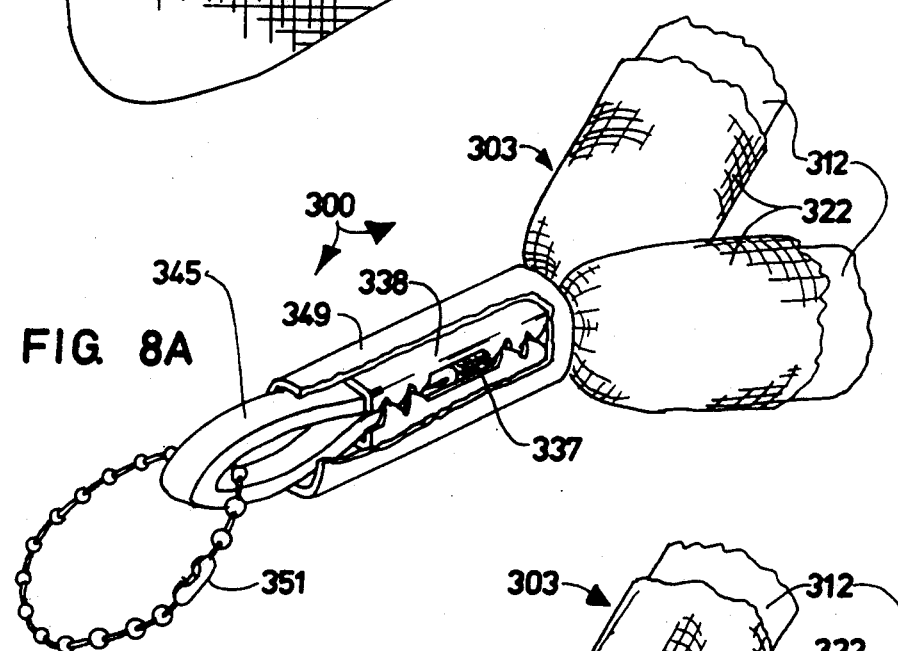
FIG. 8A is a fragmentary, perspective view of a second alternative embodiment, in which portions are broken away for clarity.
Figure 8B:
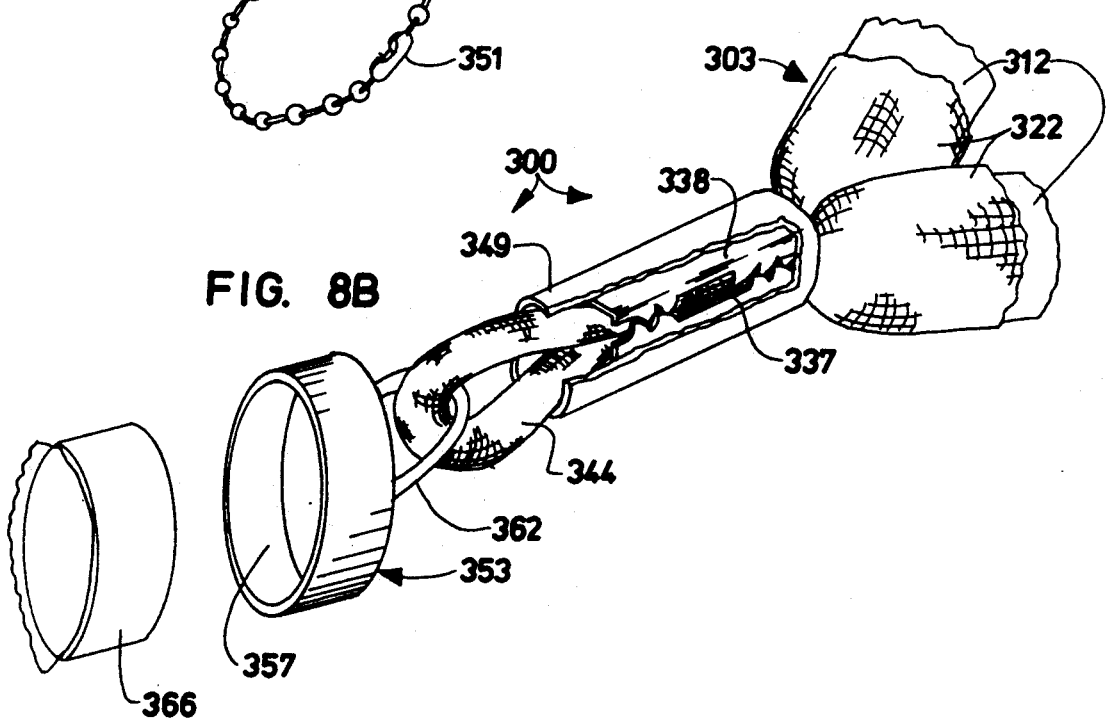
FIG. 8B is a fragmentary, perspective view of an alternative embodiment of the fastener of FIG. 8A, in which portions are broken away for clarity.

FIGS. 8A and 8B illustrate an alternative body configuration, broadly designated by the reference numeral 300. Retainer 300 can comfortably suspends a variety of articles about the wearer's neck. It will be appreciated that the same loop configuration 300 may also be comfortably worn about the shoulder, waist, or limbs, where desired.

Retainer 300 comprises an elongated, buoyant body 303 similar to body 63. Body 303 comprises a resilient, low-density foam core 312 covered by a resilient, preferably highly-colored, unitary tubular sheath 322. Body 303 is looped to fit about the wearer's neck. Ends 337 of sheath 322 project beyond the end of the foam body 303 to completely seal the core 312.

Alternative fastener designs comprise a resilient oval 345 (FIG. 8A) or a knitted loop 344 (FIG. 8B) secured to the ends of body 303 by toothed clamp 338. Loop 344 is secured by clamp 338, and the clamp 338 is preferably obscured by a resilient tubular cover 349 similar to cover 151. The body ends 327 are secured in side-by-side, generally parallel relationship. Thus the clamp and fastener project angularly outwardly or downwardly from the looped body, forming a mounting end which is outside the circular looped body.

One end of loop 344 or oval 345 projects outwardly beyond the edge of cover 349. In the embodiment of FIG. 8A, loop 344 receives a chain or key ring 351. In the alternative configuration of FIG. 8B, loop 344 permanently mounts a resilient, hollow, tubular, cap 353. Preferably cap 353 comprises an open end 357 and an integral mounting tab 362. Loop 344 is threadably mounted through tab 362 to permanently couple cap 353 to the retainer 300. Open end 357 of the cap preferably resiliently slip-fits over the end of an existing container 366, such as a tube or bottle containing a desired product. For example, container 366 may contain personal care products such as suntan lotion, lip balm, insect repellent, cosmetic products, or other product which the wearer 56 requires while enjoying water sports.

It will be appreciated that variations on the broad concept may be employed. For example, cap 353 might instead be replaced by a key chain 351 (FIG. 8A), a rigid ring, a medication or snack holder, or a novelty item having a suitable clasp or pre-defined mounting orifice similar to tab 362 (FIG. 8B). Retainer 300 will maintain the article afloat if it is inadvertently dropped into the water, so that it can be easily detected and retrieved.

Figure 9:
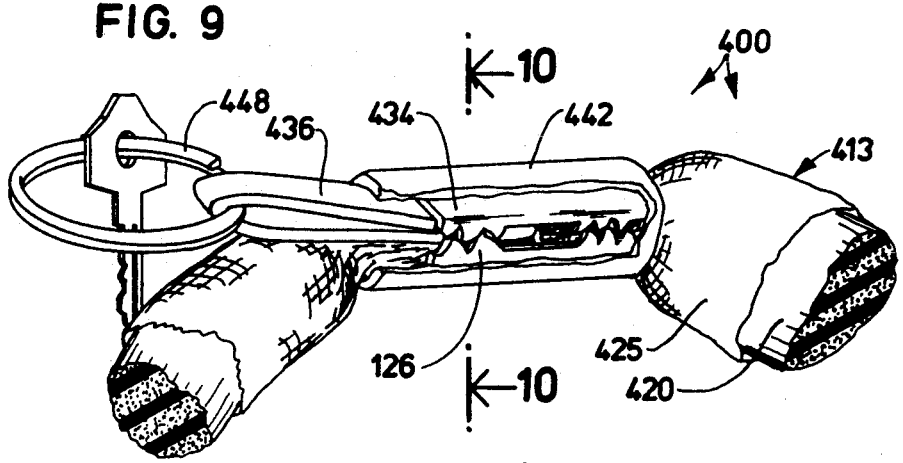
FIG. 9 is a fragmentary, perspective view of a third alternative embodiment, in which portions thereof are broken away for clarity.
Figure 10:
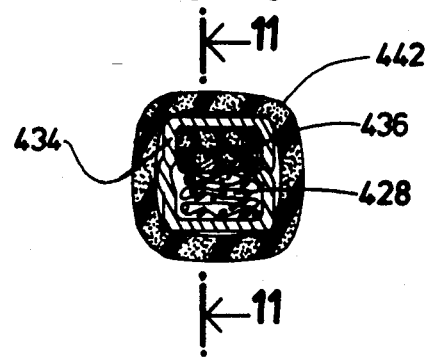
FIG. 10 is an enlarged, cross-sectional view taken generally along line 10—10 of FIG. 9; and, FIG. 11 is a fragmentary, longitudinal sectional view taken generally along line 11—11 of FIG. 10.
Figure 11:
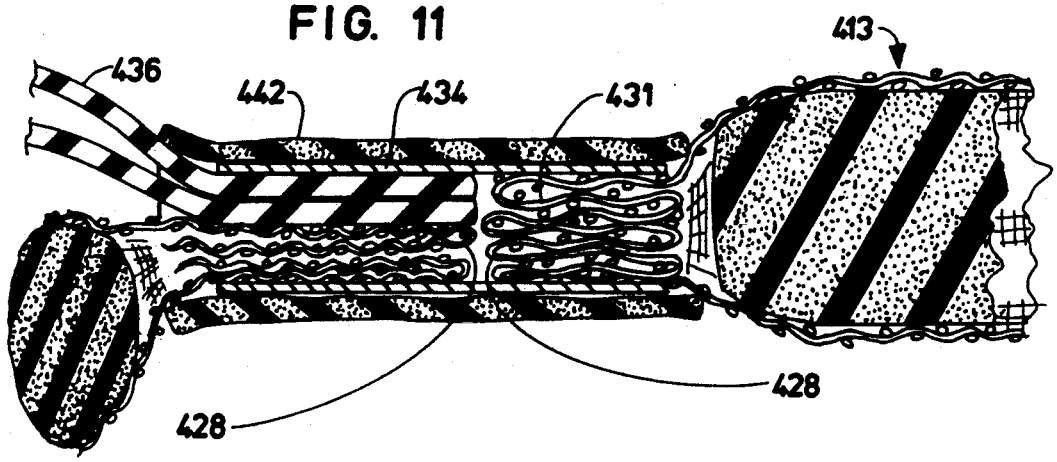

With reference now to FIGS. 9–11, an alternative loop-type configuration comprises a wrist or ankle bracelet 400. The buoyant body 413 is similar to body 63, in that it comprises a resilient, low-density foam core 420 and a brightly-colored, flexible, protective sheath 425. As best viewed in FIG. 11, the ends 428 of body 413 are axially aligned, so that the sheath ends 431 are overlapped within rigid clamp 434. Preferably the clamp also secures a resilient, flexible oval 436 which projects outwardly to receive a selected article 448, such as a key ring or chain. The exposed end of the oval 436 projects outwardly from the clamp 434 alongside the body 413 to define a mounting orifice for receiving the selected article. As in the other embodiments, clamp 434 and the ends of sheath 425 and oval 436 are protectively obscured by a resilient cover 442.

The opposing ends of body 413 are axially aligned within the clamp 434. Thus, the mounting loop is parallel with the core, and a smoothly continuous, circular body results. Hence, the article may be safely and comfortably retained upon the bracelet 400 and worn about the wearer's wrist or ankle. In the event the bracelet is removed or slips off the wearer 56, the bright bracelet body 425 can be readily detected so that the article may be quickly retrieved. The bracelet will also keep smaller articles such as a room or car key afloat in the water for easy retrieval.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A buoyant retainer for holding and floating eyewear, said retainer comprising:
    an elongated, flexible, buoyant floating rod comprising:
    a resilient core having a pair of opposing ends and comprising low-density foam;
    an outer, tubular fabric sheath coaxially covering said core for strengthening and coloring said retainer, said sheath having a pair of spaced-apart ends;
    flexible tubes for resiliently, coaxially gripping temples associated with said eyewear, said flexible tubes associated with said sheath ends; and,
    means for merging said flexible tubes with said sheath ends.

2. The retainer as defined in claim 1 wherein said core comprises a low-density, closed-cell foam selected from the group consisting of neoprene foam and polyethylene foam, and said sheath comprises a unitary, seamless knit tube of brightly-colored, water-impermeable material.

3. A retainer for holding and floating eyewear, said retainer comprising:
    an inner, flexible, buoyant rod for floating said eyewear, said rod comprised of low density foam and said rod comprising a pair of opposed ends; and,
    an outer, tubular fabric covering which coaxially surrounds said rod for strengthening and coloring said retainer, said fabric covering having opposing ends, said opposing ends of said fabric comprising means for removable attachment of said retainer to said eyewear.

4. A retainer as defined in claim 3 wherein said means for removable attachment to said eyewear comprises a pair of resilient ovals disposed at said ends and adapted to be removably attached to said eyewear.

5. A retainer as defined in claim 3 wherein said means for removable attachment to said eyewear comprises a pair of flexible rubber tubes disposed at said ends adapted to be removably attached to said eyewear.

6. A retainer for holding and floating eyewear, said retainer comprising:
    an elongated, flexible rod of low density foam having opposing ends, said rod for floating said eyewear;
    a pair of resilient ovals for engaging said eyewear, one oval attached to each of said rod ends;
    clamp means for securing said ovals to said rod ends with an exposed end of said ovals emerging from said clamp means.

7. A retainer for holding and floating eyewear, said retainer comprising:
    an elongated, flexible rod of low density foam having opposing ends, said rod for floating said eye wear;
    a pair of flexible rubber tubes for engaging said eyewear, one rubber tube attached to each of said rod ends; and,
    clamp means for securing said rubber tube means to said rod ends with an exposed end of the said rubber tubes emerging from said clamp means.

8. A buoyant retainer for holding and floating eyewear, said retainer comprising:
    an elongated, flexible buoyant floating rod having a pair of spaced apart ends, said rod comprising:
    a resilient core of low-density foam; and,
    an outer, tubular fabric sheath extending between said ends and coaxially covering said core for strengthening and coloring said retainer; and,
    flexible tubular cloth channel means disposed at each of said ends for coaxially, slidably receiving ear pieces associated with said eyewear.

9. A buoyant retainer for holding and floating eyewear, said retainer comprising:
    an elongated, flexible, buoyant floating rod having a pair of spaced apart ends, said rod comprising:
    a resilient core of low-density foam;
    an outer, tubular fabric sheath extending between said ends and coaxially covering said core for strengthening and coloring said retainer; and,
    resilient oval means secured to said ends, an exposed end of said oval means defining an orifice for resiliently receiving temples of said eyewear.

* * * * *